US012587898B2

(12) United States Patent
Koskela et al.

(10) Patent No.: US 12,587,898 B2
(45) Date of Patent: Mar. 24, 2026

---

(54) DATA ARRIVAL INDICATION

(71) Applicant: Nokia Technologies Oy, Espoo (FI)

(72) Inventors: Jarkko Tuomo Koskela, Oulu (FI);
Samuli Heikki Turtinen, Oulu (FI)

(73) Assignee: Nokia Technologies Oy, Espoo (FI)

( * ) Notice: Subject to any disclaimer, the term of this
patent is extended or adjusted under 35
U.S.C. 154(b) by 372 days.

(21) Appl. No.: 18/249,445

(22) PCT Filed: Oct. 18, 2021

(86) PCT No.: PCT/FI2021/050694
§ 371 (c)(1),
(2) Date: Apr. 18, 2023

(87) PCT Pub. No.: WO2022/084584
PCT Pub. Date: Apr. 28, 2022

(65) Prior Publication Data
US 2023/0397042 A1 Dec. 7, 2023

(30) Foreign Application Priority Data
Oct. 21, 2020 (FI) .................................... 20206038

(51) Int. Cl.
*H04W 28/02* (2009.01)
*H04W 76/15* (2018.01)
(Continued)

(52) U.S. Cl.
CPC ... *H04W 28/0268* (2013.01); *H04W 28/0263*
(2013.01); *H04W 76/15* (2018.02); *H04W
74/0833* (2013.01)

(58) Field of Classification Search
CPC ......... H04W 28/0268; H04W 28/0263; H04W
76/15; H04W 74/0833; H04W 76/27;
(Continued)

(56) References Cited

U.S. PATENT DOCUMENTS 11,778,679 B2 * 10/2023 Baek ..................... H04W 76/15
370/216
12,279,321 B2 * 4/2025 Chen ..................... H04W 76/34
(Continued)

FOREIGN PATENT DOCUMENTS

AU 2018422296 A1 10/2020
JP 2019115062 A 7/2019
(Continued)

OTHER PUBLICATIONS

Office action received for corresponding Japanese Patent Applica-
tion No. 2023-524577, dated May 1, 2024, 4 pages of office action
and 7 pages of summary translation available.
(Continued)

*Primary Examiner* — Eunsook Choi
(74) *Attorney, Agent, or Firm* — Nokia Technologies Oy

(57) ABSTRACT
There is provided a method comprising: detecting, by a user
equipment, UE, of a wireless communication network, an
arrival of data into a data buffer associated with a data bearer
configured for a secondary cell group (SCG); determining
whether or not the SCG is currently inactive; and if the SCG
is determined to be currently inactive, 5 transmitting an
indication to a network element of the wireless communi-
cation network about the arrival of data.

18 Claims, 7 Drawing Sheets

(51) Int. Cl.
*H04W 74/08* (2024.01)
*H04W 74/0833* (2024.01)

(58) Field of Classification Search
CPC ..... H04W 24/08; H04W 72/21; H04W 76/25;
H04W 76/30; H04L 47/74
See application file for complete search history.

(56) References Cited

U.S. PATENT DOCUMENTS

| | | | | |
|---|---|---|---|---|
| 2014/0192775 | A1 | 7/2014 | Li et al. | |
| 2018/0035485 | A1 | 2/2018 | Lee et al. | |
| 2018/0302848 | A1 | 10/2018 | Liu et al. | |
| 2023/0140820 | A1* | 5/2023 | Wang | H04W 76/27 |
| | | | | 370/311 |
| 2023/0199881 | A1* | 6/2023 | Freda | H04L 5/0055 |
| | | | | 370/329 |
| 2023/0217525 | A1* | 7/2023 | Kim | H04W 76/15 |
| | | | | 370/329 |
| 2023/0262501 | A1* | 8/2023 | Rugeland | H04W 76/27 |
| | | | | 370/252 |
| 2023/0308905 | A1* | 9/2023 | Teyeb | H04L 5/0035 |
| 2023/0345579 | A1* | 10/2023 | Teyeb | H04W 76/34 |

FOREIGN PATENT DOCUMENTS

| | | | |
|---|---|---|---|
| WO | 2019/099550 | A1 | 5/2019 |
| WO | 2019/213805 | A1 | 11/2019 |
| WO | 2020/088178 | A1 | 5/2020 |
| WO | 2020/114372 | A1 | 6/2020 |
| WO | 2020/151735 | A1 | 7/2020 |
| WO | 2020/167170 | A1 | 8/2020 |

OTHER PUBLICATIONS

"Efficient SCG/SCell (de)activation", 3GPP TSG-RAN WG2 #111e, Tdoc R2-2007598, Agenda: 8.2.2, Ericsson, Aug. 17-28, 2020, 8 pages.

"Support of dormancy SCG", 3GPP TSG-RAN2#108, R2-1914895, Agenda: 6.10.4.2, Oppo, Apr. 18-Nov. 22, 2019, pp. 1-6.

"5G; NR; Requirements for support of radio resource management (3GPP TS 38.133 version 15.3.0 Release 15)", ETSI TS 138 133, V15.3.0, Oct. 2018, 134 pages.

Office action received for corresponding Finnish Patent Application No. 20206038, dated Jan. 21, 2021, 9 pages.

"Report on email discussion on [107#32][NR/DCCA] MCG SCell/ SCG Resume", 3GPP TSG-RAN WG2#107bis, R2-1912880, Agenda: 6.10.4.3, Interdigital, Oct. 14-18, 2019, pp. 1-43.

"On Support of Activation/Deactivation for SCG", 3GPP RAN WG2 Meeting #111-e, R2-2006756, Agenda: 8.2.2, Interdigital Inc, Aug. 17-28, 2020, pp. 1-4.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.3.0, Sep. 2020, pp. 1-83.

Office action received for corresponding Finnish Patent Application No. 20206038, dated Sep. 17, 2021, 7 pages.

International Search Report and Written Opinion received for corresponding Patent Cooperation Treaty Application No. PCT/ FI2021/050694, dated Jan. 12, 2022, 18 pages.

Office action received for corresponding Japanese Patent Application No. 2023-524577, dated Jan. 6, 2025, 2 pages of office action and 5 pages of summary/translation available.

Extended European Search Report received for corresponding European Patent Application No. 21882223.7, dated Aug. 26, 2024, 4 pages.

"Further discussion on suspension of SCG", 3GPP TSG RAN WG2 Meeting #108, R2-1914364, Agenda: 6.10.4.3, Qualcomm Incorporated, Nov. 18-22, 2019, pp. 1-10.

Office action received for corresponding Japanese Patent Application No. 2023-524577, dated Sep. 30, 2024, 4 pages of office action and 9 pages of summary/translation available.

Office action received for corresponding Korean Patent Application No. 2023-7017090, dated Jan. 6, 2026, 10 pages of office action and no page of translation available.

* cited by examiner

602: RECEIVING CONFIGURATION INFORMATION FROM NETWORK

604: BASED ON CONFIGURATION INFORMATION, DETERMINING WHETHER TO TRANSMIT INDICATION VIA MCG OR SCG

612: RADIO QUALITY THRESHOLD EXCEEDED?

YES

NO

614: TRANSMIT INDICATION VIA SCG

616: TRANSMIT INDICATION VIA MCG

DATA ARRIVAL INDICATION

RELATED APPLICATION

This application was originally filed as PCT Application No. PCT/FI2021/050694, filed on Oct. 18, 2021, which claims priority from FI Application No. 20206038, filed on Oct. 21, 2020, each of which is incorporated herein by reference in its entirety.

TECHNICAL FIELD

The following exemplary embodiments relate to communications.

BACKGROUND

Modern wireless systems may utilize techniques, such as dual connectivity, to enhance performance of the wireless system. For example, dual connectivity may enable user equipment to be in communication with two network nodes simultaneously. It may be beneficial to provide solutions that further enhance flexibility of such techniques.

WO 2020167170, INTERDIGITAL (RAPPORTEUR). R2-1912880. Report on email discussion on [107 #32][NR/DCCA] MCG SCell/SCG Resume; 3GPP TSG-RAN WG2 #107bis, Chongqing, China, 14th-18th Oct. 2019, 2019-10-04, AU 2018422296 and INTERDIGITAL INC. R2-2006756. On Support of Activation/Deactivation for SCG; 3GPP RAN WG2 Meeting #111-e, Electronic, Aug. 17-Aug. 28, 2020, 2020-08-06 discuss resuming an inactive SCG link.

BRIEF DESCRIPTION

According to an aspect, there is provided the subject matter of the independent claims.

According to an aspect, there is provided an apparatus comprising means for performing: detecting, by a user equipment, UE, of a wireless communication network, an arrival of data into a data buffer associated with a data bearer configured for a secondary cell group, SCG; determining whether or not the SCG is currently inactive; and if the SCG is determined to be currently inactive, transmitting an indication to a network element of the wireless communication network about the arrival of data.

In an embodiment, the data bearer is configured to be suspended or not suspended.

In an embodiment the network element comprises a master node, MN, associated with a master cell group, MCG.

In an embodiment, the network element comprises a secondary node, SN, associated with the SCG.

In an embodiment, the indication is transmitted via the SCG even if the data bearer is suspended.

In an embodiment, the indication is transmitted in a radio resource obtaining procedure or on one or more radio resources obtained based on said radio resource obtaining procedure, and wherein the radio resource obtaining procedure comprises transmitting a scheduling request or initiating a random access procedure.

In an embodiment, the means are further configured to perform: if the data bearer is suspended, upon receiving an uplink grant or completion of the random access procedure, resuming the suspended data bearer.

In an embodiment, the means are further configured to perform: if the data bearer is suspended, resuming the suspended data bearer based on one or more messages received from the wireless communication network.

In an embodiment, the data bearer associated with data buffered in the data buffer is resumed.

In an embodiment, a plurality of data bearers configured for the UE for the SCG are resumed.

In an embodiment, the means are further configured to perform: determining whether to transmit the indication via MCG or via SCG, wherein the determination is based on configuration information from the wireless communication network.

In an embodiment, the configuration information comprises at least one radio quality threshold, wherein the indication is transmitted via the SCG if radio quality associated with the SCG exceeds said at least one radio quality threshold.

In an embodiment, the data bearer is not suspended, wherein the means are further configured to perform: in case radio quality associated with the SCG is equal or below at least one radio quality threshold, suspending the data bearer; and transmitting the indication via MCG.

In an embodiment, the indication causes the network element to perform one or more actions comprising resuming the data bearer if the data bearer is suspended, changing data bearer type, releasing the SCG, and/or activating the SCG.

In an embodiment, the means are further configured to perform: prevent monitoring at least one control channel for at least one cell of the inactive SCG.

According to an aspect, there is provided an apparatus comprising means for performing: receiving, by a network element of a wireless communication network, an indication from a user equipment, UE, of the wireless communication network about an arrival of data into a data buffer associated with a data bearer configured for a currently inactive secondary cell group, SCG; based on the indication, performing one or more actions regarding the data bearer and/or the inactive SCG.

In an embodiment, the one or more actions comprise resuming the data bearer if the data bearer is suspended, changing data bearer type, releasing the SCG, and/or activating the SCG.

In an embodiment, the means comprise: at least one processor; and at least one memory comprising a computer program code, wherein the at least one memory and the computer program code are configured, with the at least one processor, to cause the performance of the apparatus.

Some embodiments are defined in the dependent claims.

The embodiments that do not fall under the scope of the claims are to be interpreted as examples useful for understanding the disclosure.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are examples. Although the specification may refer to "an", "one", or "some" embodiment(s) in several locations, this does not necessarily mean that such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figures 1, 2:
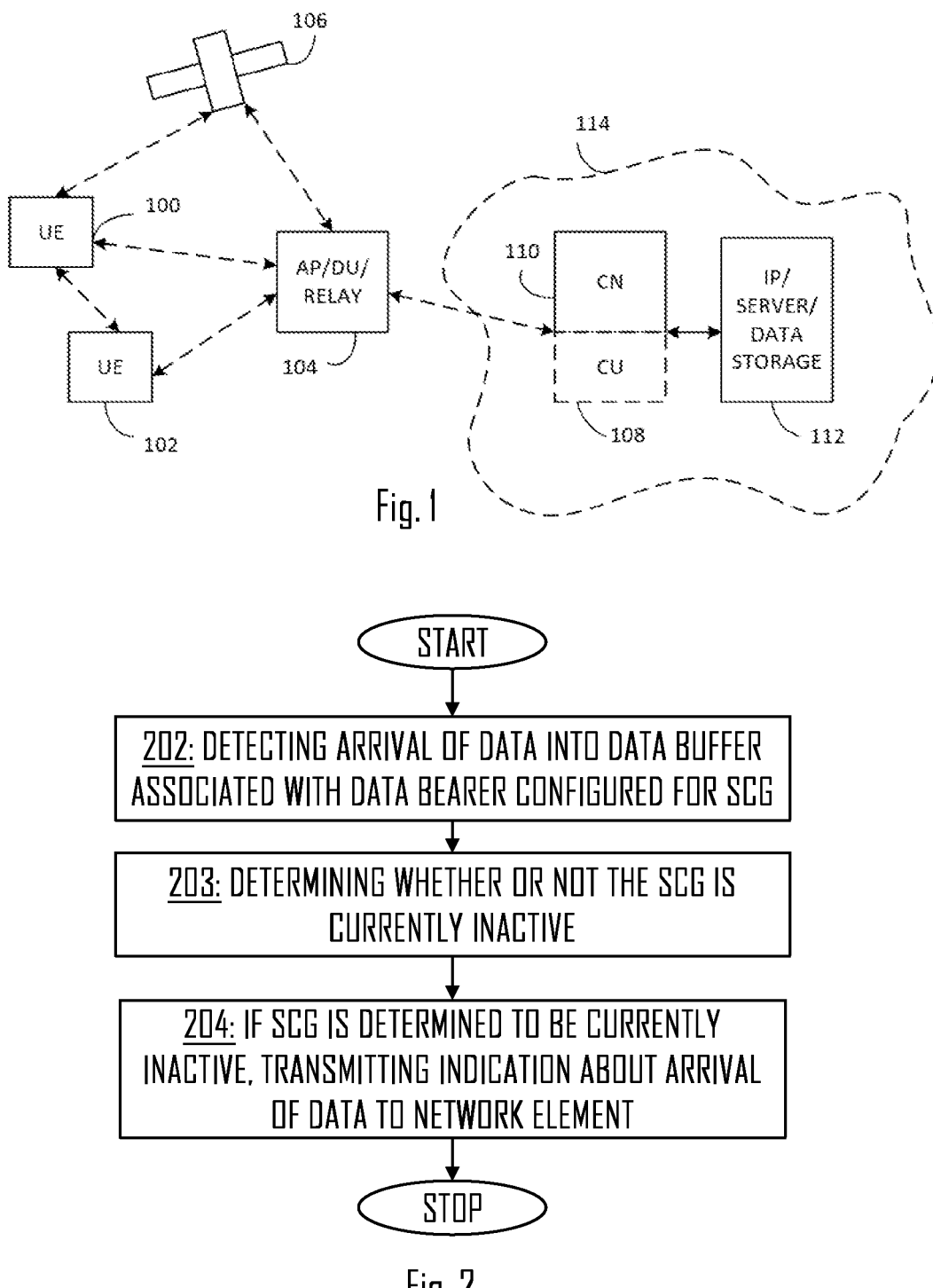
FIG. 1 illustrates an example of a wireless communication system to which embodiments may be applied.
FIGS. 2 and 3 illustrate flow diagrams according to some embodiments.

FIG. 1 depicts examples of simplified system architectures showing some elements and functional entities whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. An example of relay station may be integrated access and backhaul (IAB) node where the base station functionalities are carried out by the DU (Distributed Unit) part of the IAB node. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobility management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of relay station deployment may be IAB node in which the user device functionalities may be carried out by the MT (Mobile Termination) part of the IAB node. MT part may be responsible for providing the backhaul connection(s) with a parent node, such as parent IAB node (DU), or a donor node (DU) having a wired connection to the Centralize Unit (CU).

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink device, of which an example is a camera or video camera loading images or video clips to a network. A user device may also be a device having capability to operate in Internet of Things (IoT) network, such as Industrial IoT (IIoT) network, which is a scenario in which objects are provided with the ability to transfer data over a network without needing human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses. User device herein may also refer to vehicular implementations, such as vehicle UEs. Such UEs may be comprised and/or communicatively coupled with vehicle such that they may be understood as part of the vehicle or vehicles.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not necessarily shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and typically fully centralized in the core network. The low-latency applications and services in 5G may need to bring the content close to the radio which leads to local break out and multi-access edge computing (MEC). 5G enables analytics and knowledge generation to occur at the source of the data. This approach may need leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs may be needed to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network. The network discussed herein may refer to, for example, cellular network such as 5G and the like.

As indicated with an arrow in FIG. 1, the UEs 100, 102 (and/or any other UE of the described system) may support device-to-device (D2D) communication. D2D communication may sometimes be referred to as sidelink communication.

The wireless communication system of FIG. 1 may support dual connectivity (DC). For example, the system may support Multi Radio Access Technology (MR) DC (MR-DC). Such functionality may be utilized to support efficient activation/deactivation of Secondary Cell Group (SCG) and Secondary cells (SCells). Therefore, deactivated SCG (i.e. inactive SCG) may be introduced to the used technologies in order to achieve the efficient activation goal. For example, deactivated SCG may be treated, by UE, similarly as deactivated or dormant SCell. So, for example, for inactive (or in other words, deactivated) SCG, UE may be configured not to monitor Physical Downlink Control Channel (PDCCH). What this means is that PDCCH may not be monitored for or regarding the cell(s) belonging to the SCG. So, the UE may continue to monitor PDCCH for cells belonging to Master Cell Group (MCG). Further, for example, for deactivated SCG, the UE may be configured to continue (RRM) measurement(s) and report SCG status to the MCG (or more particularly to the Master Node (MN) associated with the MCG). Further, for example, for deactivated SCG, at least most traffic (e.g. in some cases all traffic) may be stopped. In some examples, MCG is provided by 4G (i.e. LTE-A) part of the wireless communication network whereas SCG is provided by 5G (i.e. NR) part of the wireless network.

For example, for SCell the following is specified: if the SCell is deactivated, Sounding Reference Signal (SRS) on the SCell is not transmitted, Channel State Information (CSI) for the SCell is not reported, transmissions on Uplink Shared Channel (UL-SCH) and Random Access Channel (RACH) on the SCell are not performed, PDCCH on the SCell is not monitored, PDCCH for the SCell is not monitored and Physical Uplink Control Channel (PUCCH) on the SCell is not transmitted. Similar rules and actions may be utilized for the deactivated SCG, for example. However, these rules and actions may differ.

At this point a difference is drawn between SCG bearer and SCG. SCG bearer may be a data bearer for which data can be sent on SCG. For example, data bearer may refer to a data radio bearer (DRB) or a signalling radio bearer (SRB). When such a bearer is suspended, data may not be sent on SCG. Deactivated or inactive SCG on the other hand is, as described, related to the functionality of the SCG; for example, it may mean that PDCCH for cells belonging to the SCG are not monitored by UE (i.e. for which the SCG is deactivated); for example, it may mean that PDCCH for the Primary Secondary Cell (PSCell) belonging to the SCG is not monitored by UE; for example, it may mean that PDCCH for the PSCell and zero or more or all Secondary Cells (SCells) belonging to the SCG are not monitored by UE Other action(s) may or may not be performed and these may include similar or substantially same actions as were described with reference to deactivated SCell.

Handling of data bearers, and especially data bearers associated with SCG (e.g. SCG bearer or split bearer), in case SCG is deactivated remains an open topic in the art. Hence, there may be room for improvement. Split bearer may refer to a data bearer or DRB or SRB which is associated with both SCG and MCG. One possibility could be to do nothing and whenever new data arrives to a data buffer associated with a data bearer configured for SCG, the new data may be passed through Packet Data Convergence Protocol (PDCP)/Radio Link Control (RLC), however, due to SCG being deactivated, the data could be resitting in the buffer until the SCG is again activated. It could be also possible to suspend the data bearer in which case the data would be stopped in upper layers (i.e. before it ends up to Service Data Adaptation Protocol (SDAP)/Packet Data Convergence Protocol (PDCP) entity). However, these solutions seem to fall short, and therefore there is room for further improvement.

FIG. 2 illustrates a flow diagram according to an embodiment. Referring to FIG. 2, a method for a UE of a wireless communication network is provided, the method comprising: detecting an arrival of data into a data buffer associated with a data bearer configured for a SCG (block 202); determining whether or not the SCG is currently inactive (block 203); and if the SCG is determined to be currently inactive, transmitting an indication to a network element of the wireless communication network about the arrival of data (block 204).

Figure 3:
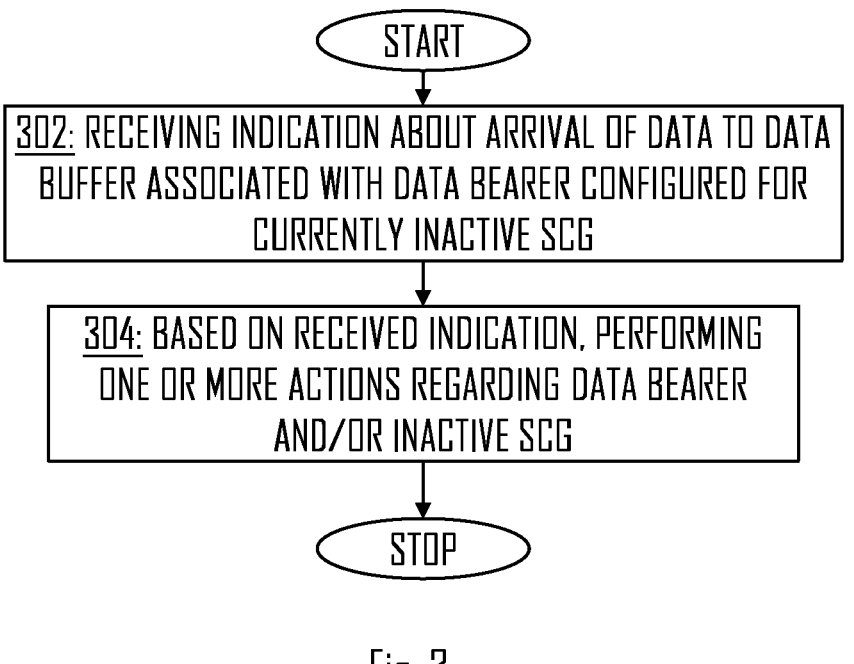

FIG. 3 illustrates a flow diagram according to an embodiment. Referring to FIG. 3, a method for a network element of a wireless communication network is provided, the method comprising: receiving an indication from a UE of the wireless communication network about an arrival of data into a data buffer associated with a data bearer configured for a currently inactive secondary cell group, SCG, of the wireless communication network (block 302); based on the indication, performing one or more actions regarding the data bearer and/or the inactive SCG (block 304).

The described methods of FIGS. 2 and 3 may be applicable in the system (e.g. wireless communication network) of FIG. 1, for example. The UE discussed with respect to FIGS. 2 and 3 may be, for example, UE 100, or UE 102, or some other similar network device(s). The network element discussed with respect to FIGS. 2 and 3 may refer to network node 104, or to CN 110/CU 108, for example, or to some other network element configured to carry out the described method steps. For example, the network element may refer to one or more network entities (e.g. physically separate network entities), such as network functions. For example, the network element may in some cases comprise MN associated with MCG or some other network node associated with the MCG. For example, the network element may in some cases comprise Secondary Node (SN) associated with SCG or some other network node associated with the SCG. Skilled person understands that MN may control MCG and SN may control SCG. For example, the UE 100, used herein as an example, may utilize MCG and/or SCG for data transfer.

According to an embodiment, the UE is configured to prevent monitoring of at least one control channel (e.g. PDCCH) for at least one cell of the inactive SCG. For example, the UE may prevent monitoring (i.e. not monitor)

one or more of the cells of the inactive SCG. In some examples, the one or more cells comprise all or some cells of the SCG. For example, the UE may prevent monitoring of control channel for the PSCell of the inactive SCG, but monitor the control channel for one or more SCells of the inactive SCG. In some cases, the UE also prevents monitoring of the control channel for said one or more SCells. That is, for inactive SCG, control channel(s) may not be monitored for one or more cells of the SCG.

Figure 4:
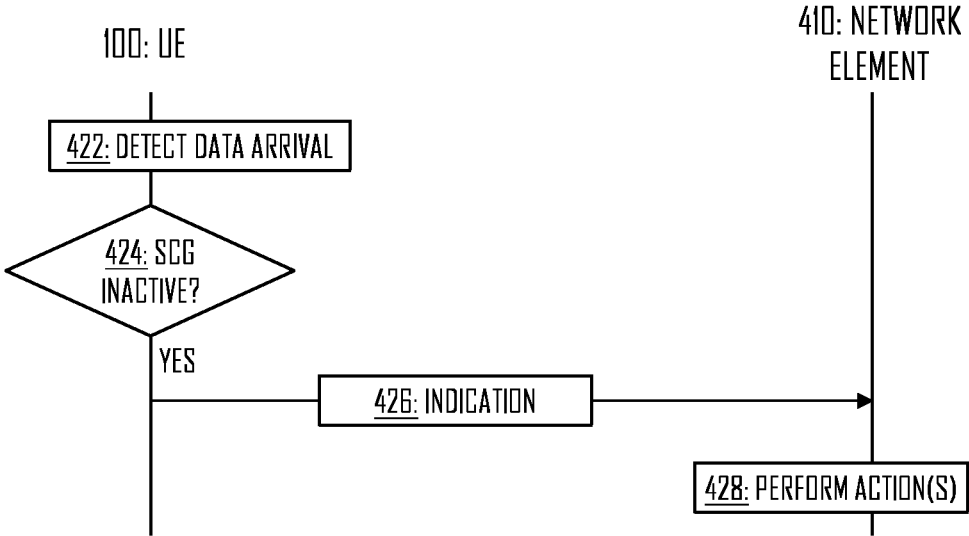
FIG. 4 illustrates a signal diagram according to an embodiment.

FIG. 4 illustrates a signal diagram according to an embodiment. Referring to FIG. 4, in block 422, UE 100 may detect data arrival into the data buffer associated with the data bearer configured for SCG. Such data bearer may be sometimes referred to as SCG bearer or a split bearer.

In block 424, the UE 100 may determine whether or not the SCG is currently inactive. Inactive SCG means that the SCG has been deactivated, i.e. is in inactive state. In other words, the UE 100 may determine whether or not the SCG is deactivated.

If SCG is determined to be inactive (or in other words, deactivated), the UE 100 may transmit, in block 426, an indication to a network element 410 (e.g. network element performing steps discussed with reference to FIG. 3). The indication may indicate that data has arrived into the data buffer that is associated with data bearer configured for currently inactive SCG. So, basically the indication indicates that data has arrived into data buffer of an inactive SCG. If SCG is determined to be active, the UE 100 may act accordingly, e.g. transmit data from the buffer utilizing SCG.

The network element 410 may receive the indication and based on the indication perform one or more actions as shown in block 428. For example, the indication sent by the UE, may cause the network element 410 to perform said one or more actions. These actions may comprise releasing the SCG, activating the SCG, resuming the data bearer if the data bearer is currently suspended and/or changing data bearer type. For example, if SCG is released, the data of the data buffer may be transmitted, by the UE 100, via MCG. Activating the SCG may enable the UE to transmit the data via the SCG. For example, activating SCG bearer may be comprised in a SCG activation procedure or new signaling may be introduced to perform activation e.g. by RRC, MAC or Downlink Control Information (DCI).

Other actions may be discussed below in more detail. For example, the network element 410 may determine and/or select which action it takes based on one or more parameters, such as data quantity parameter associated with the MCG (e.g. how much there is data in MCG or transferred via MCG), radio quality parameter associated with MCG, and/or radio quality parameter associated with SCG.

For example, changing data bearer type may comprise changing from data bearer type from SCG bearer to MCG bearer or to split bearer.

In an embodiment, with reference to FIG. 2, upon detecting the data arrival (e.g. block 202) the data bearer is suspended.

Figure 5A:
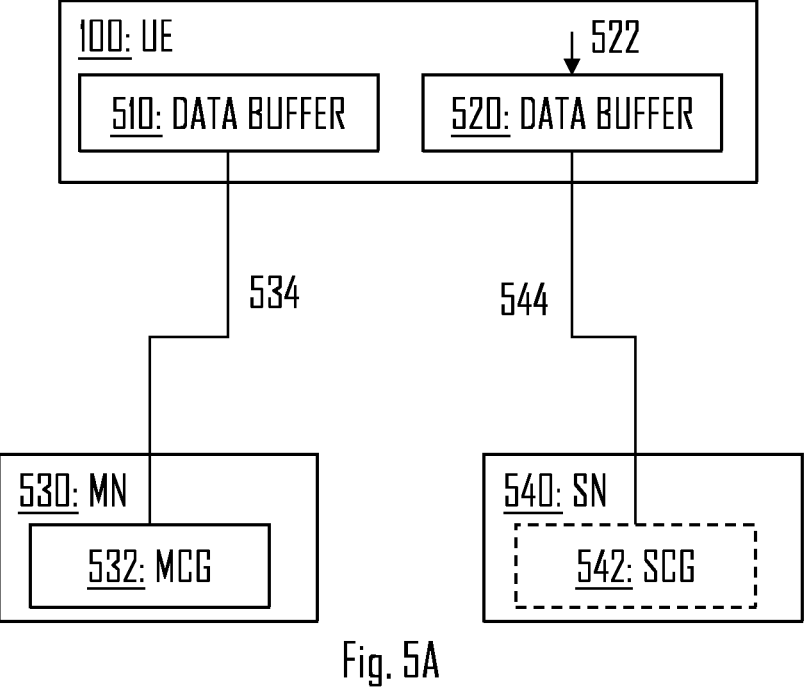
FIGS. 5A, 5B, 5C, 5D, 6A, 6B, and 7 illustrate some embodiments.
Figure 5B:
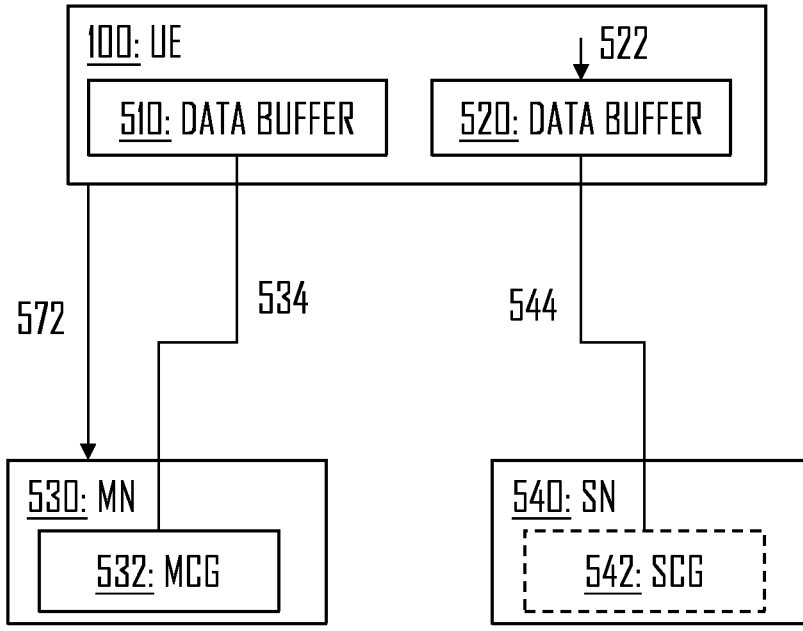
Figure 5C:
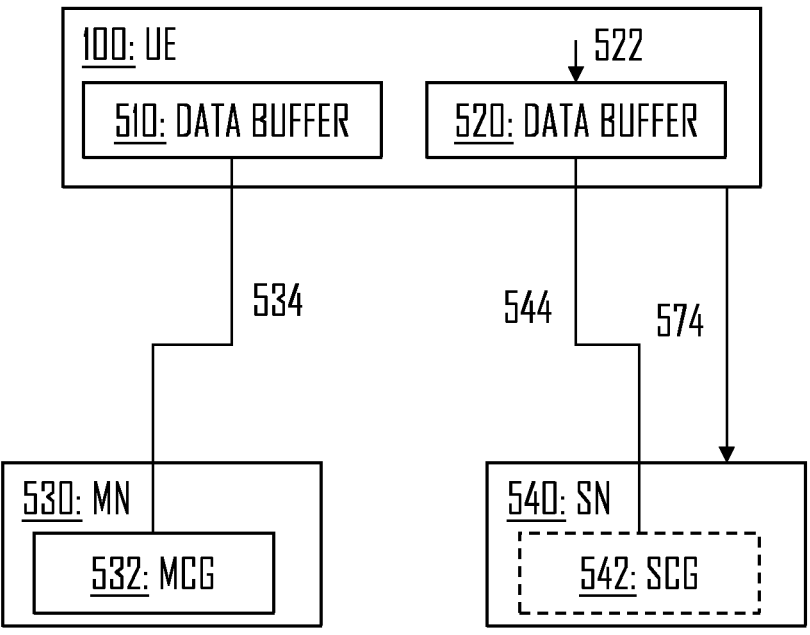

FIGS. 5A, 5B, 5C, and 5D illustrate some embodiments. Referring to FIGS. 5A, 5B, and 5C, UE 100 with two data buffers 510, 520 is depicted. Data buffer 510 may be associated with a data bearer configured for MCG and data buffer 520 may be associated with a data bearer configured for SCG (e.g. the data buffer to which data arrives in the embodiment of FIG. 2). MCG data bearer is indicated with reference number 534 and SCG data bearer with reference number 544. It is noted that there may be more than one data bearer configured for SCG and/or MCG, e.g. one for at least one cell and at least one group may comprise one or more cells. MN 530 controlling MCG 532 and SN 540 controlling SCG 542 are also illustrated.

As noted earlier, indication about data arrival may be transmitted if SCG 542 is inactive. Inactiveness is depicted as dotted lines in FIGS. 5A, 5B, and 5C. So, SCG 542 may be inactive when data 522 arrives into data buffer 520 or at least when the data arrival is detected. What this effectively means is that data 522 may not be transmitted to SN 540 on the data bearer 544 as the SCG 542 is inactive. Thus, said indication may be transmitted.

In the embodiment of FIG. 5B, the indication about the data arrival is transmitted via the MCG 532. The transmission may be to MN 530 in this case, for example. This is shown with arrow 572. The indication 572 may be transmitted from the UE to the MN 530 via the MCG 532, for example. Thus, the MN 530 may determine to perform one or more actions, such as activating the SCG 542, based on the received indication. Such activation process may comprise communication between the MN 530 and SN 540, and possibly between some other network entities as the skilled person understands.

Figure 5D:
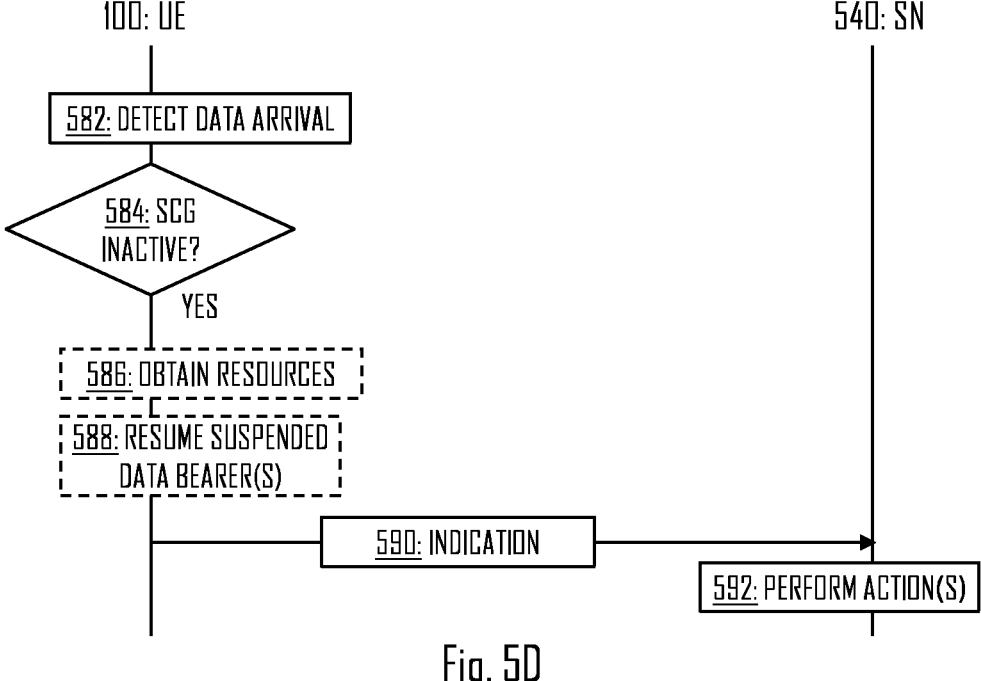

In an embodiment, the indication about the data arrival is transmitted via the SCG 542. The transmission may be to SN 540 in this case, for example. This is illustrated arrow 574 in FIG. 5C. In an embodiment, the indication is transmitted via the SCG 542 even if the data bearer 544 is suspended (i.e. is determined to be in suspended state). As noted earlier, data bearer 544 may be suspended or not suspended (i.e. active). Referring to FIG. 5D, which illustrates the process in which indication about data arrival is transmitted via the SCG 542 (e.g. to SN 540), in block 582, the UE 100 may detect data arrival similarly as in block 202.

In block 584, the UE 100 may determine whether or not the SCG 542 is inactive. If yes, the process may continue to the UE 100 transmitting the indication 574 in block 590 via the SCG 542 (e.g. to SN 540). The SN 540 may perform one or more actions in block 592 based on the received indication (e.g. see blocks 304 and 428).

According to an embodiment, the UE 100 is configured to obtain radio resources from the wireless communication network (block 586); and after obtaining the radio resources, transmitting the indication (block 590). In one example, the radio resources are obtained via scheduling request (SR). That is, the UE 100 may transmit SR to the network (e.g. to SN 540), and obtain radio resource allocation from the network in response to the SR. In another example, the radio resources may be obtained via random access procedure. E.g. random access procedure may be initiated by the UE 100 in order to obtain resources for transmitting the indication in block 590.

In an embodiment, the indication about data arrival is transmitted in a radio resource obtaining procedure or on one or more radio resources obtained based on said radio resource obtaining procedure. For example, the radio resource obtaining procedure may comprise transmitting a SR or initiating a random access procedure. In an example embodiment, the SR comprises the indication about data arrival. Thus, the indication transmission may be comprised in the radio resource obtaining procedure in some examples.

As discussed, in some examples the data bearer 544 may be in suspended state. Therefore, in an embodiment, the UE 100 may resume (block 588) the suspended data bearer 544 after or upon obtaining radio resources (block 586). For example, block 588 may be performed after, in response to, or upon receiving an uplink grant or completion of random access procedure.

In an embodiment, the data bearer 544 is resumed based on one or more messages received from the wireless communication network. Hence, the network element 410 may initiate resuming the data bearer. For example, the network element 410 (e.g. MN 530 or SN 540) may transmit said message(s). The message(s) may be transmitted via Radio Resource Control (RRC) signalling, for example. So, this kind of indication based resuming may take place e.g. in block 588 or at some other time, i.e. the resuming the suspended data bearer may not necessarily be limited to the situation in which data arrival is detected.

In an embodiment, in block 588 and/or based on one or more messages received from the wireless communication network, the data bearer 544 associated with the data buffer 520 is resumed. Thus, the network element may in some cases send an explicit command or configuration that causes the UE to resume the data bearer 544. Said one or more messages may indicate the data bearer 544 or bearers to be resumed, for example. In other words, the data bearer 544, associated with data buffered in the data buffer 520 (i.e. buffered data), may be resumed. In another example embodiment, a plurality of data bearers (e.g. some or all) configured for the UE 100 for the SCG 542 are resumed. Different SCG data bearers may be in different states: suspended or not suspended. These may be controlled separately or jointly: suspended radio bearers may be resumed one-by-one (e.g. as data arrives into the data buffer of the data bearer) or in groups (e.g. including a plurality of data bearers, e.g. some or all SCG data bearers), to name a couple of examples.

The indication about data arrival (e.g. block 204, block 302, block 426, 572, 574, 590) may be comprised in a RRC message (e.g. UEInformationTransfer or a new RRC message).

In another example, Media Access Control (MAC) Control Element (CE) may be used for the data arrival indication. An existing or a new MAC CE may be used. One example of existing MAC CE may be Buffer Status Report (BFR) which may reflect buffer status of the other cell group (e.g. MCG) as well. So, the indication may be transmitted in a BSR in one example. In this example, the indication may be comprised in the BSR.

In another example, physical layer (PHY) signalling may be used for the data arrival indication. Thus, e.g. a SR resource may be allocated in MCG 532 for the UE 100 to indicate the data arrival. So, if SCG is deactivated, the UE 100 may request resources from the network to transmit the indication to the MCG 532, or more particularly to the MN 530.

Utilizing RRC message(s), MAC CE (e.g. BSR), and or PHY signalling may be especially suitable for transmitting the indication to the MCG 532, or more particularly to the MN 530.

Figure 6A:
Figure 6B:
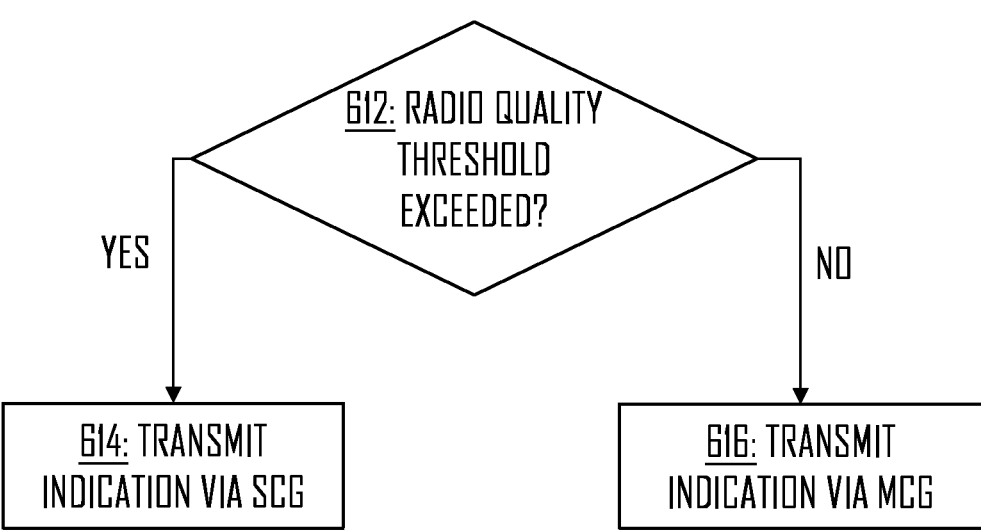

FIGS. 6A to 6B illustrate some embodiments. Referring to FIG. 6A, in block 604, the UE 100 may determine whether to transmit the indication via the MCG 532 or SCG 542, wherein the determination is based on configuration information from the wireless communication network. The configuration information may be received e.g. in block 602 prior to block 604. In an embodiment, the configuration information is transmitted by the network element 410 (e.g. MN or SN) to the UE 100.

In an embodiment, the configuration information comprises at least one radio quality threshold. The indication may be transmitted, by the UE, via the SCG 542 if radio quality associated with the SCG 542 exceeds said at least one radio quality threshold. Example of this is shown in FIG.

6B. That is, in block 612, the UE may determine whether or not the radio quality exceeds the at least one radio quality threshold. If yes, the UE may transmit the indication to via SCG (block 614). If no, the UE 100 may transmit the indication via the MCG (block 616). So, whether to send via MCG 532 or SCG 542 (or particularly to MN 530 or SN 540) may depend on radio quality of the SCG 542. For example, the UE may send the indication via the SCG 542 (e.g. to SN 540) if quality of Primary Secondary Cell (PSCell) of the SCG exceeds (e.g. is above or at threshold) a radio quality threshold. So, if the quality of the PSCell is below or at a threshold, the indication may be transmitted via MCG. In some cases, transmission via SCG may be prioritized. For example, this may be achieved by setting appropriate threshold. The at least one threshold may be configured by the network (e.g. by network element 410). The at least one threshold may comprise Reference Signal Received Power (RSRP), Reference Signal Received Quality (RSRQ) and/or signal-to-interference-plus-noise ratio (SINR) threshold(s) to name a few examples. For example, if more than one threshold is utilized one or more of said more than one threshold may need to be exceeded in order to transmit the indication via the SCG.

Block 612 may be performed, for example, after detecting the data arrival to the data buffer and determining that the SCG 542 is inactive. So, before transmitting the indication, the UE may determine whether to transmit the indication via the SCG or MCG.

In an embodiment, the configuration information indicates whether the UE 100 should transmit the indication via the MCG 532 or SCG 542. So, for example, the network may configure the UE 100 to indicate the data arrival to MCG or SCG (or more particularly to MN or SN). Such indication may be, for example, explicit: i.e. transmit indication(s) to MN or SN.

In an embodiment, the indication via the SCG (e.g. block 614) is transmitted based on radio resources obtained via SR or random access procedure on random access channel (RACH).

In an embodiment, the indication via the MCG (e.g. block 616) is transmitted on MAC CE (e.g. BSR), RRC message or as PHY message.

It is noted, that in principle, the UE may transmit e.g. the indication via the SCG or MCG. That is, the indication may be transmitted to MN or SN, but the UE may not necessarily be aware the entity it is transmitting the indication. So, the UE may be configured to and/or select MCG or SCG which it may use for transmitting the indication. That is, the indication may be transmitted over the MCG or SCG by the UE. In principle, the indication transmitted via or over the MCG may be decoded by the SN instead of MN, for example.

Figure 7:
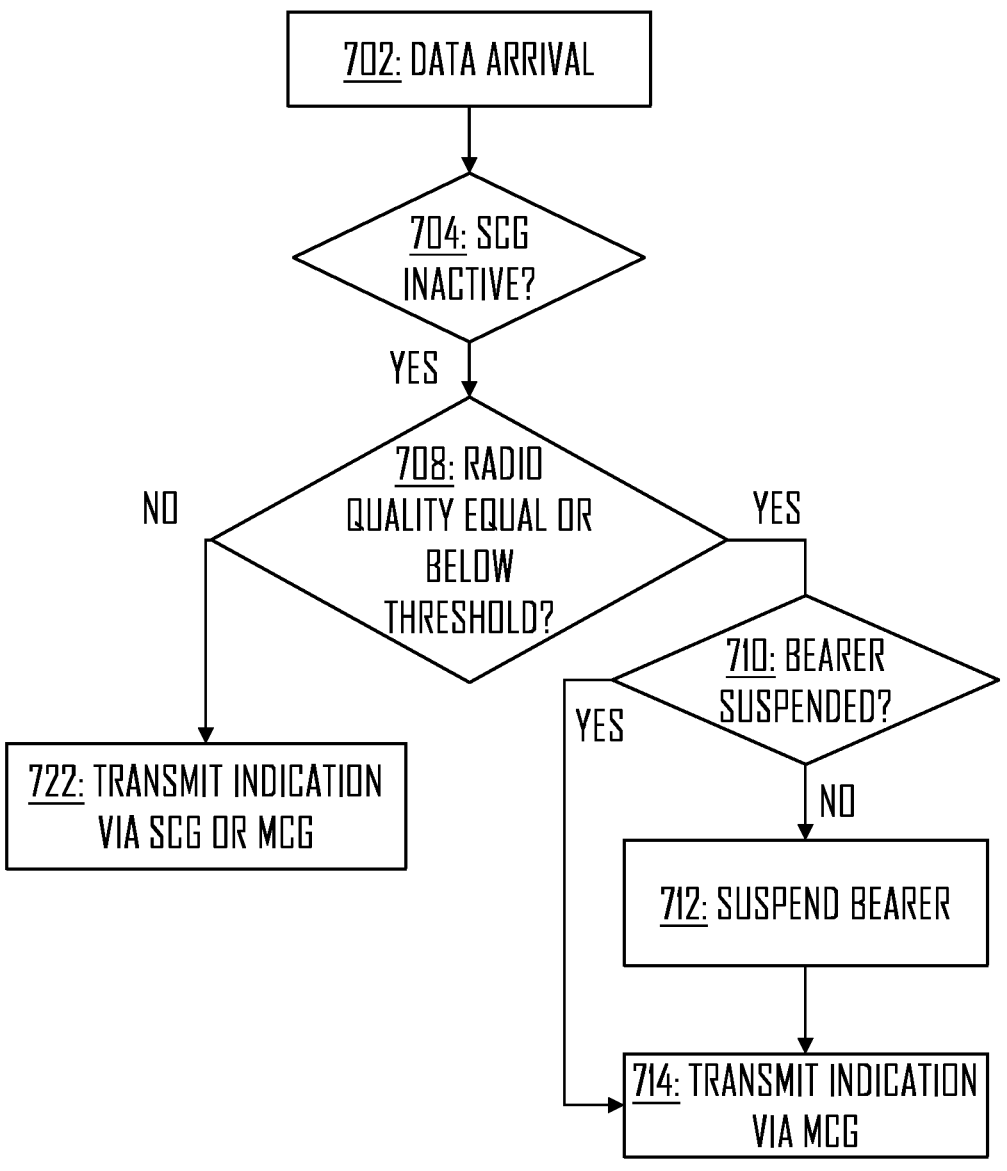

FIG. 7 illustrates some embodiments. Referring to FIG. 7, in block 712, the UE may suspend the data bearer 544 in case in case radio quality associated with the SCG 542 is equal or below at least one radio quality threshold (see block 708). Hence, the indication about data arrival may be transmitted via the MCG (block 714) as SCG bearer or bearers may be suspended in block 712. It is noted that said bearer may be suspended in block 712 if it is in not suspended state.

For example, data arrival may be detected by the UE 100 in block 702 into the data buffer. If SCG is determined to be inactive (block 704), the process may continue to block 708. In block 708, the UE 100 may determine whether or not the radio quality associated with the SCG 542 is equal or below the at least one radio quality threshold (e.g. RSRP, RSRQ, SINR, to name a few examples). If radio quality is equal or below said threshold(s), the process may continue to block 710. If radio quality is above said threshold(s), the process may continue to block 722.

In block 710, the UE 100 may further determine whether or not the data bearer is suspended. If no, the data bearer 544 may be suspended in block 712. If the data bearer is already suspended, the process may continue directly to block 714, i.e. the indication may be transmitted via the MCG 532.

It is noted at this point that the data bearer associated with the SCG may refer to SCG bearer or split bearer. Thus, for example, the data bearer 544 may be a SCG bearer or a split bearer.

In an embodiment, in case the data bearer is not suspended when the SCG is inactive, the following options may be used:

a) In case the PSCell quality of the SCG is above the threshold (e.g. in terms of RSRP, RSRQ, and/or SINR) in block 708, the UE 100 may start forwarding data to SCG 542 and trigger the indication to SCG 542 (or more particularly to SN 540) as proposed above. So, in this example, in block 722, the indication may be transmitted to SN if the radio quality is above threshold(s) (e.g. threshold is exceeded).

b) In case the PSCell quality of the SCG is equal to or below threshold, the UE 100 may suspend the SCG bearer (or all or some SCG bearers) and trigger the indication to MCG/MN (e.g. block 714).

Alternatively, or additionally to performing the quality check of block 708 in response to detecting data arrival into data buffer associated with inactive SCG 542, the suspension/resumption may be performed in response to determining that the radio quality of the SCG 542 is above threshold(s) (e.g. exceeds the threshold(s)). For example, if radio quality is equal to or below the threshold(s), the data bearer may be suspended (e.g. as in block 712). For example, if radio quality is above said threshold, the data bearer may be resumed. So, the UE 100 may perform block 708 e.g. periodically and/or in response to block 702.

The proposed solutions may enable the indication of uplink data arrival into inactive SCG's buffer in an efficient and flexible manner. For example, SCG resources may not be used in case radio quality of the SCG, and particularly the radio quality of the radio bearer 544, is not good enough (e.g. does not exceed a set threshold). In such case it would not be beneficial to activate the SCG 542. Instead, transmission of data via the MCG may be preferred.

Figure 8:
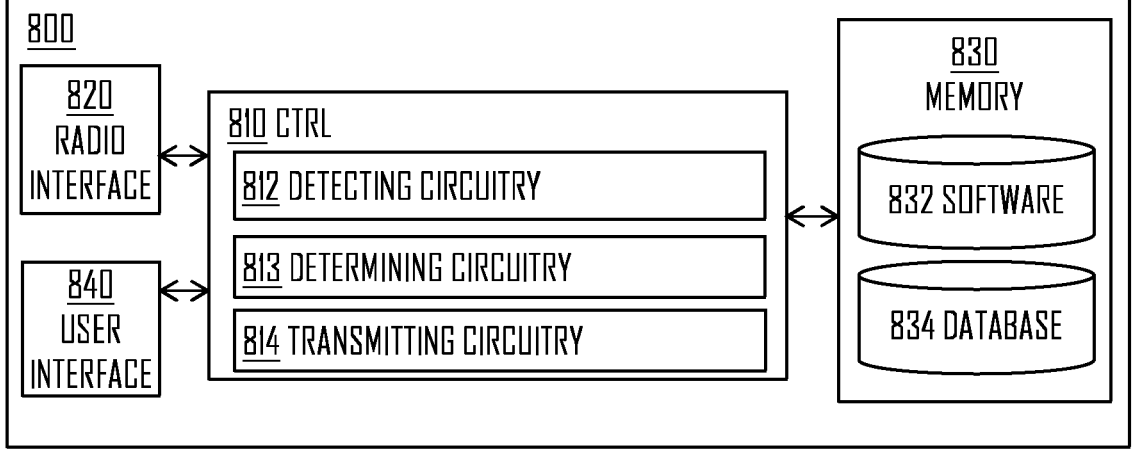
FIGS. 8 and 9 illustrate block diagrams of apparatuses according to some embodiments.
Figure 9:
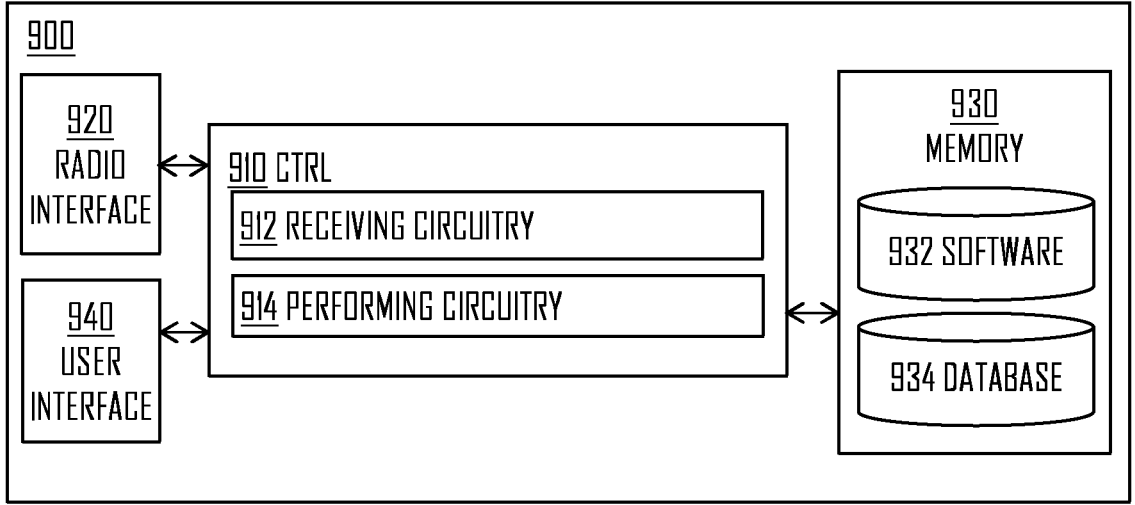

FIGS. 8 and 9 provide apparatuses 800, 900 comprising a control circuitry (CTRL) 810, 910, such as at least one processor, and at least one memory 830, 930 including a computer program code (software) 832, 932, wherein the at least one memory and the computer program code (software) 832, 832, are configured, with the at least one processor, to cause the respective apparatus 800, 900 to carry out any one of the embodiments of FIGS. 1 to 7, or operations thereof.

Referring to FIGS. 8 and 9, the memory 830, 930, may be implemented using any suitable data storage technology, such as semiconductor based memory devices, flash memory, magnetic memory devices and systems, optical memory devices and systems, fixed memory and removable memory. The memory 830, 930 may comprise a database 834, 934 for storing data.

The apparatus 800, 900 may further comprise radio interface (TRX) 820, 920 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas.

The apparatus 800, 900 may comprise user interface 840, 940 comprising, for example, at least one keypad, a microphone, a touch display, a display, a speaker, etc. The user interface 840, 940 may be used to control the respective apparatus by a user of the apparatus 800, 900.

In an embodiment, the apparatus 800 may be or be comprised in the UE performing the method described above e.g. with respect to FIG. 2. For example, the apparatus 800 may be or be comprised in the UE 100 or UE 102.

In an embodiment, the apparatus 900 may be or be comprised in the network element performing the method described above e.g. with respect to FIG. 3. For example, the apparatus 900 may be or be comprised in the network node 104, or similar network node.

According to an embodiment, with reference to FIG. 8, the control circuitry 810 comprises a detecting circuitry 812 configured at least to perform operations described with respect to block 202 of FIG. 2; a determining circuitry 813 configured at least to perform operations described with respect to block 203 of FIG. 2; and a transmitting circuitry 814 configured at least to perform operations described with respect to block 204 of FIG. 2.

According to an embodiment, with reference to FIG. 9, the control circuitry 910 comprises a receiving circuitry 912 configured at least to perform operations described with respect to block 302 of FIG. 3; and a performing circuitry 914 configured at least to perform operations described with respect to block 304 of FIG. 3.

In an embodiment, at least some of the functionalities of the apparatus 900 may be shared between two physically separate devices, forming one operational entity. Therefore, the apparatus 900 may be seen to depict the operational entity comprising one or more physically separate devices for executing at least some of the described processes. Thus, the apparatus 900 utilizing such shared architecture, may comprise a remote control unit (RCU), such as a host computer or a server computer, operatively coupled (e.g. via a wireless or wired network) to a remote radio head(s) (RRH) located in a base station or network node 104, for example. In an embodiment, at least some of the described processes may be performed by the RCU. In an embodiment, the execution of at least some of the described processes may be shared among the RRH and the RCU. For example, CU/DU split may utilize such shared architecture.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

According to an aspect there is provided a system comprising one or more apparatuses 800 and one or more apparatuses 900. For example, the one or more apparatuses 900 may comprise MN and SN, and apparatuses 800 may comprise one or more UEs.

As used in this application, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that utilize software or firmware for operation, even if the software or firmware is not physically present. This definition of 'circuitry' applies to uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 7 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 7, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus (es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, words and expressions herein should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A user equipment of a wireless communication network, the user equipment comprising at least one processor, and at least one memory including computer program code, wherein the at least one memory and the computer program code are configured, with the at least one processor, to cause the user equipment to perform operations comprising:

detecting, by the user equipment, an arrival of data into a data buffer associated with a data bearer configured for a secondary cell group, SCG;

determining whether or not the SCG is currently inactive; and if the SCG is determined to be currently inactive, transmitting an indication to a network element of the wireless communication network about the arrival of data, wherein the indication is sent via the secondary cell group or via a master cell group based on configuration information received from the network.

2. The user equipment of claim 1, wherein the data bearer is configured to be suspended or not suspended.

3. The user equipment of claim 1, wherein the network element comprises a master node, MN, associated with a master cell group, MCG.

4. The user equipment of claim 1, wherein the network element comprises a secondary node, SN, associated with the SCG.

5. The user equipment of claim 4, wherein the indication is transmitted via the SCG even if the data bearer is suspended.

6. The user equipment of claim 4, wherein the indication is transmitted in a radio resource obtaining procedure or on one or more radio resources obtained based on said radio resource obtaining procedure, and wherein the radio resource obtaining procedure comprises transmitting a scheduling request or initiating a random access procedure.

7. The user equipment of claim 6, wherein the at least one memory and the computer program code are configured, with the at least one processor, to cause the apparatus user equipment further to perform operations comprising:

if the data bearer is suspended, upon receiving an uplink grant or completion of the random access procedure, resuming the suspended data bearer.

8. The user equipment of claim 6, wherein the at least one memory and the computer program code are configured, with the at least one processor, to cause the user equipment further to perform operations comprising:

if the data bearer is suspended, resuming the suspended data bearer based on one or more messages received from the wireless communication network.

9. The user equipment of claim 7, wherein the data bearer associated with data buffered in the data buffer is resumed.

10. The user equipment of claim 7, wherein a plurality of data bearers configured for the user equipment for the SCG are resumed.

11. The user equipment of claim 1, wherein the configuration information comprises at least one radio quality threshold, wherein the indication is transmitted via the SCG if radio quality associated with the SCG exceeds said at least one radio quality threshold.

12. The user equipment of claim 1, wherein the data bearer is not suspended, and wherein the at least one memory and the computer program code are configured, with the at least one processor, to cause the user equipment further to perform operations comprising:

in case radio quality associated with the SCG is equal or below at least one radio quality threshold, suspending the data bearer; and transmitting the indication via MCG.

13. The user equipment of claim 1, wherein the indication causes the network element to perform one or more actions comprising resuming the data bearer if the data bearer is suspended, changing data bearer type, releasing the SCG, and/or activating the SCG.

14. The user equipment of claim 1, wherein the at least one memory and the computer program code are configured, with the at least one processor, to cause the user equipment further to perform operations comprising:

prevent monitoring at least one control channel for at least one cell of the inactive SCG.

15. An apparatus comprising at least one processor, and at least one memory including computer program code, wherein the at least one memory and the computer program code are configured, with the at least one processor, to cause the apparatus to perform operations comprising:

transmitting configuration information to a user equipment, UE, to transmit indication of data arrival via a currently inactive secondary cell group or via a master cell group;

receiving, by a network element of a wireless communication network, an indication from a user equipment, UE, of the wireless communication network about an arrival of data into a data buffer associated with a data bearer configured for the secondary cell group, SCG; and based on the indication, performing one or more actions regarding the data bearer and/or the inactive SCG.

16. The apparatus of claim 15, wherein the one or more actions comprise resuming the data bearer if the data bearer is suspended, changing data bearer type, releasing the SCG, and/or activating the SCG.

17. A method, comprising:

detecting, by a user equipment, UE, of a wireless communication network, an arrival of data into a data buffer associated with a data bearer configured for a secondary cell group, SCG;

determining whether or not the SCG is currently inactive; and if the SCG is determined to be currently inactive, transmitting an indication to a network element of the wireless communication network about the arrival of data, wherein the indication is sent via the secondary cell group or via a master cell group based on configuration information received from the network.

18. A method, comprising:

transmitting by a network element of a wireless communication network, configuration information to a user equipment, UE, to transmit indication of data arrival via a secondary cell group or via a master cell group;

receiving, by the network element of a wireless communication network, an indication from a user equipment, UE, of the wireless communication network about an arrival of data into a data buffer associated with a data bearer configured for a currently inactive secondary cell group, SCG; and based on the indication, performing one or more actions regarding the data bearer and/or the inactive SCG.

\* \* \* \* \*